Sept. 24, 1940.        H. E. BRYAN         2,215,749
HOG AND FISH SCRAPER
Filed Nov. 16, 1938
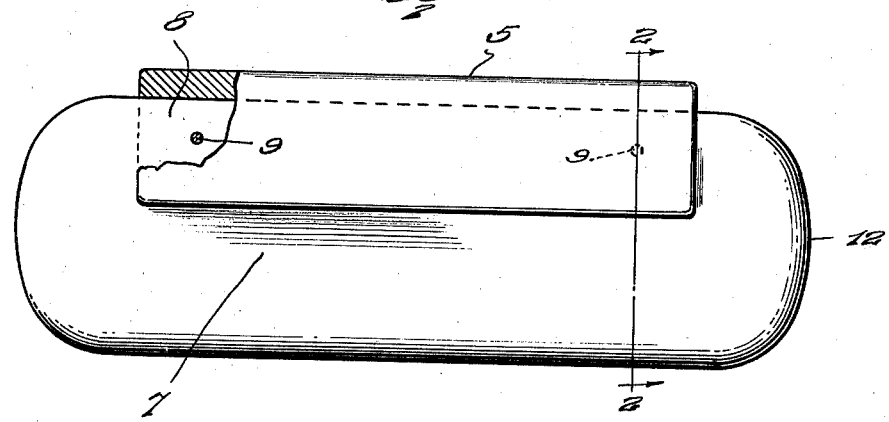
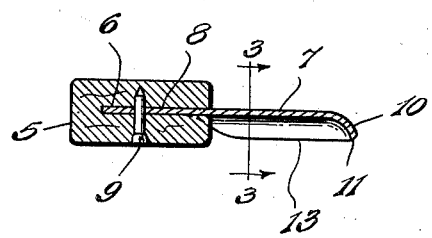
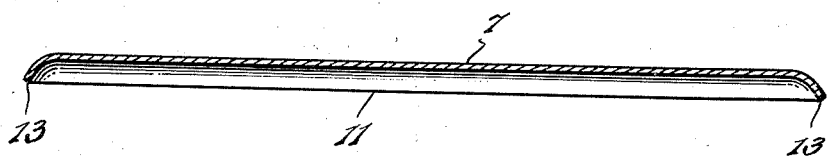
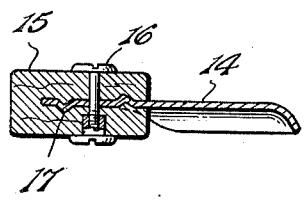
Inventor
H. E. Bryan.
By Lacey & Lacey
Attorneys _Patented Sept. 24, 1940_

2,215,749

UNITED STATES PATENT OFFICE 2,215,749

HOG AND FISH SCRAPER

Herbert E. Bryan, Glenwood, Ala.

Application November 16, 1938, Serial No. 240,808

3 Claims. (Cl. 17—19)

This invention relates to scrapers and more particularly to a scraper especially designed for scraping hogs, fish and the like.

The object of the invention is to provide a scraper of simple and inexpensive construction adapted for use by butchers, fish merchants and others, and by means of which hogs may be scraped or the scales removed from fish in a more efficient manner and in less time than heretofore.

A further object of the invention is to provide a scraper comprising a supporting handle having a scraping blade seated therein and provided with a straight longitudinally disposed concavo-convex scraping edge and oppositely disposed curved ends formed with concavo-convex scraping edges whereby to permit the use of either edge according to the nature of the work to be performed.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a front elevation of a scraper embodying the present invention, a portion of the supporting handle being broken away to show the manner of securing the scraping blade therein, Figure 2 is a transverse sectional view taken on the line 2—2 of Figure 1, Figure 3 is a longitudinal sectional view taken on the line 3—3 of Figure 2, and Figure 4 is a transverse sectional view illustrating a modified form of the invention.

The improved scraper forming the subject-matter of the present invention comprises a supporting handle 5 preferably formed of wood and having a longitudinal kerf or seat 6 formed therein and opening through one edge of the handle, as shown. Associated with the handle is a scraping blade 7 preferably stamped or otherwise formed from a single sheet of metal, one longitudinal edge of which is flat and straight, as indicated at 8, and adapted to fit within the seat or kerf 6 and in which position it is securely retained by means of nails or similar fastening devices 9. The other longitudinal edge of the blade 7 is concavo-convex in cross section, as indicated at 10, to form a scraping edge 11 which may be used either for scraping hogs or removing scales from fish. The opposite ends of the blade 5 are curved or rounded at 12 to form terminal scraping edges 13 also concavo-convex in cross section, as best shown in Figures 1 and 3 of the drawing.

In using the device, the scraper is supported in the hand and moved longitudinally over the hide of a hog, thereby causing the scraping edge 11 to contact with said hide and effectively remove any bristles or other foreign matter adhering thereto. When it is desired to scrape portions of a hog which cannot be readily reached by the scraping edge 11, the scraper is tilted in the hand and either of the curved edges 12 thereof utilized for scraping purposes. The same operation is repeated for removing scales from fish and the like.

It will here be noted that the concavo-convex formation of the blade not only produces a dished-like scraping edge but also serves to reinforce and strengthen the blade and prevent accidental bending thereof when in use.

In Figure 4 of the drawing, there is illustrated a modified form of the invention, in which the scraping blade 14 is detachably secured within the kerf of the supporting handle 15 by a sectional screw or similar fastening device 16, the upper or flat edge of the blade being preferably corrugated at 17 so as to bite into the adjacent walls of the kerf of the handle and assist in preventing accidental displacement of the cutting blade. In this form of the device as well as in the form shown in Figure 1 of the drawing, the formation of the blade-receiving kerf in the supporting handle imparts a slight resiliency to the walls of the kerf so that, when the blade is fitted in the kerf, the fastening devices will compress said walls in engagement with the cutting blade and assist in holding said cutting blade firmly in position on said handle.

While the device is particularly designed for scraping hogs and fish, it will, of course, be understood that said device may be used with equally good results for scraping butchers' meat blocks, or the walls, ceilings or floors of rooms and other structures.

It will, of course, be understood that the scrapers may be made in different sizes and shapes and constructed of any suitable material without departing from the spirit of the invention.

Having thus described the invention, what is claimed as new is:

1. A scraper comprising a supporting handle having a seating kerf formed therein, a scraping blade concavo-convex in cross section throughout its entire length and having a straight flat portion fitting within the kerf of the handle, said blade having its opposite ends rounded to form curved scraping edges, and fastening devices extending through the handle and straight portion of said blade.

2. A scraper comprising an elongated handle having a longitudinal kerf formed therein and opening through one edge thereof, a scraping blade having a portion thereof at one longitudinal edge of the blade flat and seated within the kerf and another portion thereof at the opposite longitudinal edge of the blade dished laterally to form a scraping edge, said blade being of greater length than the handle and disposed in the same longitudinal plane with the handle, the opposite ends of the blade being rounded and dished transversely to form curved scraping edges merging into the first-mentioned scraping edge.

3. A scraper comprising a supporting handle having a seating kerf formed therein and opening through one edge thereof, a concavo-convex scraping blade having a flat longitudinally corrugated portion detachably fitted within said kerf and provided with oppositely disposed curved scraping edges, and a fastening device extending through the corrugated portion of the blade and said handle for clamping the walls of the kerf in engagement with the corrugated portion of the scraping blade.

HERBERT E. BRYAN.